US010503738B2

(12) United States Patent
Jhamtani et al.

(10) Patent No.: US 10,503,738 B2
(45) Date of Patent: Dec. 10, 2019

(54) GENERATING RECOMMENDATIONS FOR MEDIA ASSETS TO BE DISPLAYED WITH RELATED TEXT CONTENT

(71) Applicant: Adobe Inc., San Jose, CA (US)

(72) Inventors: Harsh Jhamtani, Kanpur (IN); Siddhartha Kumar Dutta, Thane (IN); Midhun Gundapuneni, Hyderabad (IN); Shubham Varma, Ahmedabad (IN); Cedric Huesler, San Jose, CA (US)

(73) Assignee: Adobe Inc., San Jose, CA (US)

( * ) Notice: Subject to any disclaimer, the term of this patent is extended or adjusted under 35 U.S.C. 154(b) by 868 days.

(21) Appl. No.: 15/162,947

(22) Filed: May 24, 2016

(65) Prior Publication Data

US 2017/0270123 A1    Sep. 21, 2017

Related U.S. Application Data

(60) Provisional application No. 62/310,040, filed on Mar. 18, 2016.

(51) Int. Cl.
G06F 17/30    (2006.01)
G06F 16/2457    (2019.01)
(Continued)

(52) U.S. Cl.
CPC ........ *G06F 16/24578* (2019.01); *G06F 16/40* (2019.01); *G06F 17/241* (2013.01); *G06F 17/2785* (2013.01)

(58) Field of Classification Search
CPC .. G06F 16/24578; G06F 16/40; G06F 17/241; G06F 17/2785
See application file for complete search history.

(56) References Cited

U.S. PATENT DOCUMENTS 7,028,253 B1 *  4/2006  Lieberman .............. G06F 16/58
                                                    715/232
7,162,197 B2 *  1/2007  Kitamura ............... A63H 33/38
                                                    434/317
(Continued)

OTHER PUBLICATIONS

The Gunning's Fog Index (or FOG) Readability Formula, Accessed on Internet at Jun. 21, 2019, 3 pages.
(Continued)

Primary Examiner — Jeff A Burke
(74) Attorney, Agent, or Firm — Kilpatrick Townsend & Stockton LLP

(57) ABSTRACT

Certain embodiments involve creating multimedia content with text and media assets that illustrate the text. Multiple sentences are ranked on various features. A sentence ranking is determined based on, for example, the presence of important phrases in the sentence, the degree to which informational content of the sentence can be represented through a media asset, the presence of one or more sentiments associated with the sentence, and the readability of the sentence. In some examples, the ranked sentences are analyzed to determine similar information content, and the sentences are re-ranked based on this analysis. A subset of the ranked sentences with higher ranks are analyzed to determine similarities between content in the sentence and text descriptions of media assets. This analysis can be used to select appropriate images or other media assets. Multimedia content is generated in which the selected media assets are positioned near the set of sentences.

18 Claims, 6 Drawing Sheets

(51) Int. Cl.
    *G06F 17/27*    (2006.01)
    *G06F 16/40*    (2019.01)
    *G06F 17/24*    (2006.01)

(56) References Cited

U.S. PATENT DOCUMENTS

| | | | | |
|---|---|---|---|---|
| 7,930,647 | B2* | 4/2011 | Skrenta | G06F 16/4393 |
| | | | | 715/788 |
| 8,208,737 | B1* | 6/2012 | Ie | G06K 9/00469 |
| | | | | 382/175 |
| 9,075,812 | B1* | 7/2015 | Heyward | G06F 16/156 |
| 2008/0320384 | A1* | 12/2008 | Nagarajan | G06F 16/58 |
| | | | | 715/255 |
| 2009/0063455 | A1* | 3/2009 | Li | G06F 16/58 |
| 2011/0153412 | A1* | 6/2011 | Novikov | G06Q 30/02 |
| | | | | 705/14.42 |
| 2012/0062766 | A1* | 3/2012 | Park | H04N 1/00307 |
| | | | | 348/231.5 |
| 2012/0156659 | A1* | 6/2012 | Yun | G09B 5/06 |
| | | | | 434/157 |
| 2012/0229505 | A1* | 9/2012 | Kuga | G01C 21/00 |
| 2014/0040712 | A1* | 2/2014 | Chang | G06F 17/212 |
| | | | | 715/202 |
| 2014/0114643 | A1* | 4/2014 | Baker | G06F 17/241 |
| | | | | 704/9 |
| 2015/0012525 | A1* | 1/2015 | Lindsay | G06F 16/24578 |
| | | | | 707/722 |
| 2015/0302083 | A1* | 10/2015 | Simske | G06F 17/279 |
| | | | | 707/750 |
| 2017/0061250 | A1* | 3/2017 | Gao | G06F 16/3347 |
| 2017/0115853 | A1* | 4/2017 | Allekotte | G06F 3/0482 |
| 2017/0132821 | A1* | 5/2017 | Valliani | G06F 17/241 |

OTHER PUBLICATIONS

Word2vec—Tool for Computing Continuous Distributed Representations of Words, Accessed from Internet on Jun. 20, 2019, 4 pages.

Agrawal et al., Enriching Textbooks With Images, In Proceedings of the 20th ACM International Conference on Information and Knowledge Management, 2011, pp. 1847-1856.

Aletras et al., Representing Topics Using Images, Proceedings of NAACL-HLT, Jun. 9-14, 2013, pp. 158-167.

Blood et al., Disagreement on Agreement: Two Alternative Agreement Coefficients, In SAS Global Forum, Statistics and Data Analysis, 2007, 12 pages.

Tf-idf weighting, https://stanford.edu/IR-book/html/htmledition/tf-idf-weighting-1.html, 2008 Cambridge University Press.

Carbonell et al., The Use of MMR, Diversity-Based Reranking for Reordering Documents and Producing Summaries, In Proceedings of the 21st Annual International ACM SIGIR Conference on Research and Development in Information Retrieval, Aug. 1998, pp. 335-336.

Coyne et al., WordsEye: An Automatic Text-to-Scene Conversion System, In Proceedings of the 28th Annual Conference on Computer Graphics and Interactive Techniques, 2001, pp. 487-496.

Delgado et al., Automated Illustration of News Stories, In Semantic Computing (ICSC), IEEE Fourth International Conference, 2010, pp. 73-78.

Kendall, A New Measure of Rank Correlation, Biometrika, vol. 30, Nos. 1-2, Jun. 1938, pp. 81-93.

Leong et al., Text Mining for Automatic Image Tagging, In Proceedings of the 23rd International Conference on Computational Linguistics: Posters, Coling 2010, Aug. 2010, pp. 647-655.

Luhn, The Automatic Creation of Literature Abstracts, IBM Journal Res. Dev, vol. 2, No. 2, Apr. 1958, pp. 159-165.

Mihalcea et al., TextRank: Bringing Order into Texts, Proceedings of the Conference on Empirical Methods in Natural Language Processing, Available online at: http://www.aclweb.org/anthology/W04-3252, Jul. 2004, pp. 404-411.

Mikolov et al., Distributed Representations of Words Phrases and their Compositionality, In Advances on Neural Information Processing Systems, Oct. 2013, pp. 1-9.

Ramos, Using TF-IDF to Determine Word Relevance in Document Queries, In Proceedings of the first instructional conference on machine learning, 2003, 4 pages.

Salton et al., A Vector Space Model for Automatic Indexing, Communications of the ACM, vol. 18, No. 11, Nov. 1975, pp. 613-620.

Spearman, The Proof and Measurement of Association Between Two Things, The American Journal of Psychology, vol. 15, No. 1, Jan. 1904, pp. 72-101.

Steinberger et al., Using Latent Semantic Analysis in Text Summarization and Summary Evaluation, In Proc., ISIM04, 2004, pp. 93-100.

Vajjala et al., Readability Assessment for Text Simplification: From Analysing Documents to Identifying Sentential Simplifications, International Journal of Applied Linguistics, vol. 165, No. 2, 2014, pp. 194-222.

Zhu et al., A Text-to-Picture Synthesis System for Augmenting Communication, AAAI, vol. 7, 2007, pp. 1590-1595.

* cited by examiner

GENERATING RECOMMENDATIONS FOR MEDIA ASSETS TO BE DISPLAYED WITH RELATED TEXT CONTENT

RELATED APPLICATIONS

The present application claims priority to U.S. provisional application No. 62/310,040 for "GENERATING RECOMMENDATIONS FOR MEDIA ASSETS TO BE DISPLAYED WITH RELATED TEXT CONTENT" filed Mar. 18, 2016, which is incorporated by reference herein in its entirety.

FIELD OF THE INVENTION

This application relates generally to computer-implemented methods and systems and more specifically relates to selecting images or other media assets that correspond to text for display with the text to improve selection of assets for large collections of content items.

BACKGROUND

Web content illustrated with images or videos often draw the attention of the reader. For example, users may be more engaged with the content of an article displayed as images, resulting in more views of that article, and consumers are more likely to consider or contact a business when an image that accompanies the local search results allows a consumer to more readily determine that a particular search result is more relevant for the consumer's purposes. Moreover, in many scenarios, a user can absorb information more quickly when that information is presented using a combination of text and graphical communication. For instance, an article presented with an appropriate number of relevant images may be comprehended more efficiently and may hold a reader's attention more effectively than a similar article without images.

Websites can include hundreds of webpages containing articles or other text content that would benefit from suitable images or other graphical media assets. A user, such as a marketer or website manager, may be unable to review each webpage to determine whether graphical media assets are helpful and, if so, what type of assets are appropriate for the text content contained on the webpage. In addition, repositories of available and allowed media assets may contain thousands of media assets, each asset having technical characteristics (e.g., an asset type, a size, a resolution) and content characteristics (e.g., a depicted image, a license for use, appropriateness for an age bracket, etc.). A digital repository may be updated frequently, as groups of assets are automatically introduced or removed. Familiarizing a user with all available assets to determine which particular one is suitable for a given text item may therefore be infeasible or impractical. Moreover, there may be multiple images that are relevant to a text content item, which makes the process of manually choosing the most appropriate images a tedious process.

Prior solutions for modifying web pages and other electronic content to include selected media assets may present disadvantages. For instance, in certain cases, individual sentences in a web page or other electronic content may be analyzed to identify media assets that correspond to the content of those sentences. But focusing on individual sentences for can provide sub-optimal results for selecting appropriate media assets to include with the web page or other electronic content. In one example, focusing on individual sentences may overlook contextual information that is conveyed by a set of sentences when considered together. In another example, selecting a media asset for each analyzed sentence may cause too many assets to be selected, especially for text content such as long and complicated online articles. In these examples, or other cases where media assets are selected without considering sets of sentences in combination, selecting media assets to accompany text in a web page or other electronic content will utilize computing resources expended on the selection process without enhancing a user's engagement with the web page or other electronic content.

Therefore, it is desirable to provide methods and systems to quickly and accurately analyze text in a content item and to select relevant media assets for an appropriate number of sentences in the text content.

SUMMARY

According to certain embodiments, systems and methods are disclosed for creating multimedia content that includes both text and media assets that illustrate or otherwise correspond to the text. For example, multiple sentences are ranked on various features. A ranking for a sentence is determined based on, for example, the presence of important phrases in the sentence, the degree to which informational content of the sentence can be represented through a media asset, the presence of one or more sentiments associated with the sentence, and the readability of the sentence. In some examples, the ranked sentences are analyzed to determine similar information content, and the sentences are re-ranked based on this analysis (e.g., to avoid assigning pictures to multiple sentences with similar content). A subset of the ranked sentences with higher ranks are analyzed, for example, to determine similarities between content in the sentence and text descriptions of media assets (e.g., "tags" or captions for an image). Such analysis is then used to select appropriate images or other media assets. Multimedia content is then generated in which the selected images or other media assets are positioned near the set of sentences.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
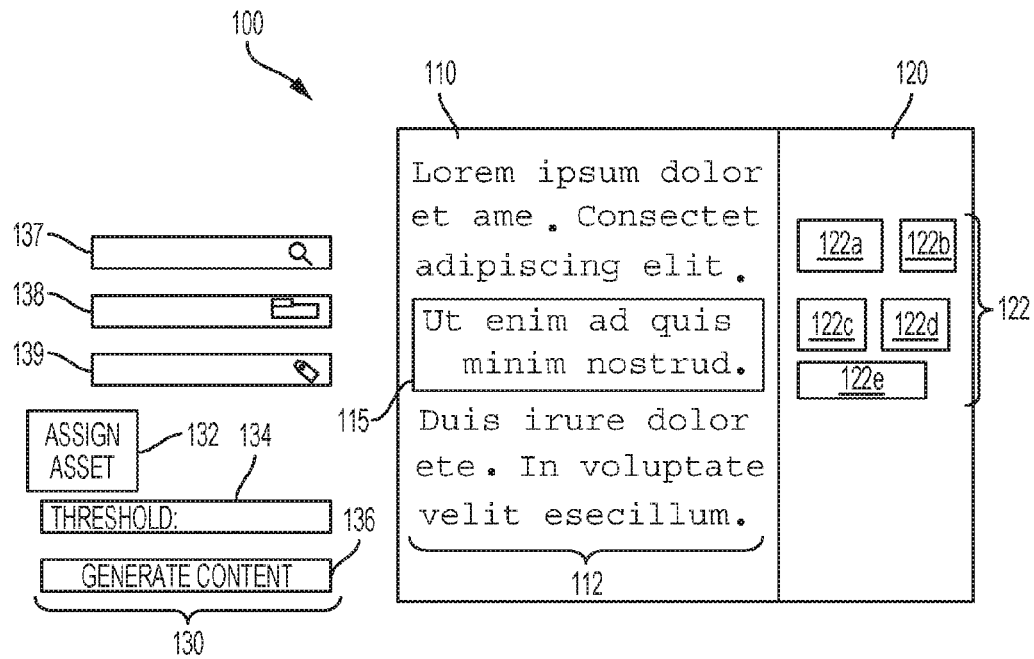
FIG. 1 is a diagram depicting an example of a user interface in which a preview panel displays media assets associated with a selected sentence according to certain embodiments.

Embodiments are disclosed that create multimedia content having both text and media assets that illustrate or otherwise correspond to the text. For example, a set of sentences from a text content item (e.g., an online article) is analyzed to determine certain features for each sentence in the set, such as a picturability of each sentence, the presence of important phrases in the sentence, the readability of the sentence, and the presence of certain sentiments in the sentence. This analysis is used to rank the analyzed sentences based on the determined features. Appropriate media assets are selected for a sub-set of highly-ranked sentences, such as those sentences ranked above a certain threshold number. Analyzing the sentences as a set allows for a targeted number of relevant media assets to be selected and presented with the text content.

Prior efforts to associate assets with text may analyze individual words or sentences, and do not capture the context information that is represented by the sentences as a set. For example, computer-aided analysis of individual sentences using such existing methods may result in inappropriate or poorly selected images, which do not engage a user with the analyzed text. By contrast, the embodiments and features disclosed herein provide improvements in the selection of media assets for text by more accurately analyzing sets of sentences in the text, resulting in more efficient use of computing resources. Media assets that are available to be selected may be more efficiently allocated between multiple different text content items. In addition, the described improvements may select a set of assets that is more engaging to a viewer, resulting in increased visitor traffic to a website, longer engagement time with the text items, increased conversion rates for product sales or other user interactions, and improvements to other metrics related to content-oriented websites.

In certain embodiments, an analytical application performs this analysis and allows multimedia content with text and associated media assets to be generated. For example, a suitable computing system executes the analytical application to determine certain features of a set of sentences. The determined features are relevant to ranking the sentences. These features include the presence of important phrases, the sentence's picturability, the sentiments associated with the sentence, and the readability of the sentence. The analytical application identifies important phrases based on, for example, semantic similarity between sentences, word and phrase frequency, latent semantic analysis, term frequency-inverse document frequency ("TF-IDF"), or other suitable techniques. A sentence containing important phrases is generally likely to improve comprehension of the set of sentences when associated with a media asset.

The analytical application determines the readability of a sentence based on, for example, metrics such as a statistical classification of the sentence's readability (e.g., a Fog index). "Readability" can be defined as how difficult a sentence is to read and understand. A sentence with low readability is generally likely be comprehended more easily with an associated media asset.

The analytical application determines a sentence's picturability by, for example, counting the number of images in a database that are tagged with a given word (or a synonym of the given word) in the sentence. "Picturability" can be defined as the degree to which informational content may be represented pictorially. A sentence with high picturability is generally likely to be easily associated with a media asset.

The analytical application identifies sentiments associated with a sentence by evaluating the presence of negative words or phrases. "Sentiment" or "sentiment polarity" can be defined as the extent to which a sentence has a positive or negative expression. It may be undesirable to associate a media asset with a sentence with a very negative (e.g., hateful) sentiment.

In some embodiments, the analytical application uses some combination of these features to assign ranks to different sentences in a set of sentences. Ranks indicate a degree to which a given sentence is suitable for selection to have one or more media assets associated with the sentence. A prioritized ranking for a sentence indicates, for example, that the sentence is generally likely to benefit from being displayed with an associated media asset. In some embodiments, ranked sentences have a specific value assigned as the rank. For example, sentences may receive a numerical rank or a descriptive rank such as "most suitable" to "least suitable." In additional or alternative embodiments, ranked sentences have a category or classification. For example, sentences may be ranked as "should receive an asset" or as "should not receive an asset." A prioritized rank may be indicated by a high rank, or by any other suitable indication.

In some cases, multiple sentences having a prioritized rank may contain overlapping information content. For example, the sentences "the boy chases the dog," and "the boy is chasing the dog" may each receive a high ranking. In certain embodiments, the ranked sentences are re-ranked to eliminate sentences having overlapping information content. For example, a sentence having a relatively high rank may be compared to another sentence having a relatively lower rank, and the degree of overlap between the compared sentences may be determined. The sentences may be re-ranked according to the determined overlap, such that a sentence having a high degree of overlap with another sentence may be reassigned a relatively lower rank.

In some embodiments, sentences having a relatively prioritized rank after ranking (or after re-ranking) are selected to have an associated media asset. For example, a selected sentence may be analyzed to determine its informational content. A group of available media assets, such as from a database or repository, may each be analyzed to determine the informational content for each of the assets in the group. One or more of the analyzed assets may be associated with the selected sentence based on a comparison of the informational content of the selected sentence with the informational content of the analyzed assets.

In some embodiments, the analytical application then generates multimedia content in which the analyzed sentences are displayed in proximity to the media assets associated with each particular analyzed sentence. This multimedia content may be displayed to a user via a suitable computing device.

As used herein, the term "text content item" is used to refer to a collections of characters that conveys information about a given topic, such as a news article. A text content item includes sentences. A text content item may be an article, a weblog post, a poem, a piece of computer code, a collection of comments in an online forum, a collection of posts in a social media application, or any other collection of characters that conveys information on a given topic.

As used herein, the term "sentence" is used to refer to a collection of text characters that are organized to convey information to a reader. A sentence may be part of a text content item. A sentence may be a collection of text readily understood as written natural language, or may be a collection of text that conforms to rules other than natural language (e.g., an instruction in a computer language, a sentence based on slang or "pidgin" language rules).

As used herein, the term "rank" is used to refer to a degree to which a given sentence would benefit from having one or more associated media assets displayed by the sentence. For example, a first sentence having a relatively higher rank may be more easily understood when displayed by an associated media asset, as compared to a second sentence having a relatively lower rank. In some embodiments, a rank is ordered using any suitable system, such as a highest ranked sentence, a second-highest ranked sentence, etc. In additional or alternative embodiments, a rank indicates a category, such as a sentence having a rank indicating "should have an associated asset." The term "ranking" is used herein to refer to a process by which such a rank is assigned to a sentence.

As used herein, the term "threshold" is used to refer to an indication of whether a particular sentence having a particular rank is selected to be associated with one or more media assets. A threshold may be received from a user, or may be received from a different computing system, or may have a default value. A threshold may indicate how many sentences in a set are selected (e.g., selecting the ten most highly ranked sentences, or selecting the 15% highest ranked sentences). Additionally or alternatively, a threshold may indicate a necessary rank to select a ranked sentence (e.g., selecting all sentences having a rank at or above "good").

As used herein, the term "media asset" is used to refer to a representation of information that improves understanding of a sentence. Examples of a media asset include a still image, animated image, video item, audio item, hyperlink to a webpage having related content, an application having interactive displays of content, or any other suitable information item. Assets may be received from a networked database, or may be received from a local repository. Assets may be divided into groups based on additional metrics, such as indications that an asset is relevant (e.g., "tags"), authorization to use a particular asset, or appropriateness of a given asset to a particular audience, (e.g., adults or children, paid subscribers or non-subscribed readers).

As used herein, the term "picturability" is used to refer to a feature describing an ease by which a particular sentence can be represented by one or more images. Systems and methods for determining the picturability of a sentence are described further herein.

As used herein, the term "readability" is used to refer to a feature describing an each with which a sentence may be read and understood. Systems and methods for determining the readability of a sentence are described further herein.

As used herein, the term "sentiment" is used to refer to a feature describing a degree to which a sentence expresses a positive or negative emotion. Systems and methods for determining the sentiment of a sentence are described further herein.

As used herein, the term "important phrases" is used to refer to a feature describing a degree to which a sentence contains words, phrases, or keywords that convey information important to the topic of the sentence or the text content item from which the sentence came. Systems and methods for determining the important phrases of a sentence are described further herein.

Referring now to the drawings, FIG. 1 is a diagram depicting an example of a user interface allowing a user to view one or more media assets associated with a selected sentence. In some embodiments, operations related to a user interface 100 are performed on the same computing system as the analytical application, on a different computing system, or both. In certain embodiments, the user interface 100 includes a viewing pane 110, a preview area 120, and a group of interaction elements 130.

In the depicted example, a set of sentences 112 is displayed in the viewing pane 110. The set of sentences 112 may include a text content item such as an article. In additional or alternative embodiments, the set of sentences 112 may include other text content, such as a weblog post or a social media post, or a collection of text content items, such as a group of articles, a group of text responses to an article or weblog post (e.g., "comments"), or a social media "feed."

In some embodiments, the analytical application analyzes and ranks the set of sentences 112 as described herein. The user interface 100 indicates a particular sentence 115 as having one or more associated media assets 122a-122e. Although not depicted here, a particular sentence 115 may be indicated as having no associated media assets. For example, a sentence may lack an associated media asset if that sentence did not receive a sufficiently high rank.

In the example depicted in FIG. 1, the preview area 120 displays the one or more media assets 122a-122e (collectively, media assets 122). In some embodiments, the media assets 122 are associated with the sentence 115 based on the analysis performed by the analytical application. In additional or alternative embodiments, the preview area 120 may display additional media assets that are not associated with the sentence 115, but are still identified as candidates for association (e.g., "favorite" assets frequently accessed by the user, specific assets accessed by the user, etc.).

In the depicted example, a group of interaction elements 130 are displayed. In some embodiments, such elements are used to receive user inputs indicating specific interactions with the user interface 100. For example, element 132 may allow a user to assign a particular one of the media assets 122 to the sentence 115. As another example, element 134 may receive a threshold from the user, indicating that analysis of the set of sentences 112 should select associated media assets for sentences ranked above the received threshold. In additional or alternative embodiments, the threshold may have a default value. As another example, element 136 may receive input for generating a multimedia content item based on the content displayed in viewing pane 110. As another example, elements 137-139 may receive input for indicating a search request, uploading a specific media asset, or limiting the displayed media assets 122. Other suitable user interface elements will be immediately understood by those skilled in the art.

Figure 2:
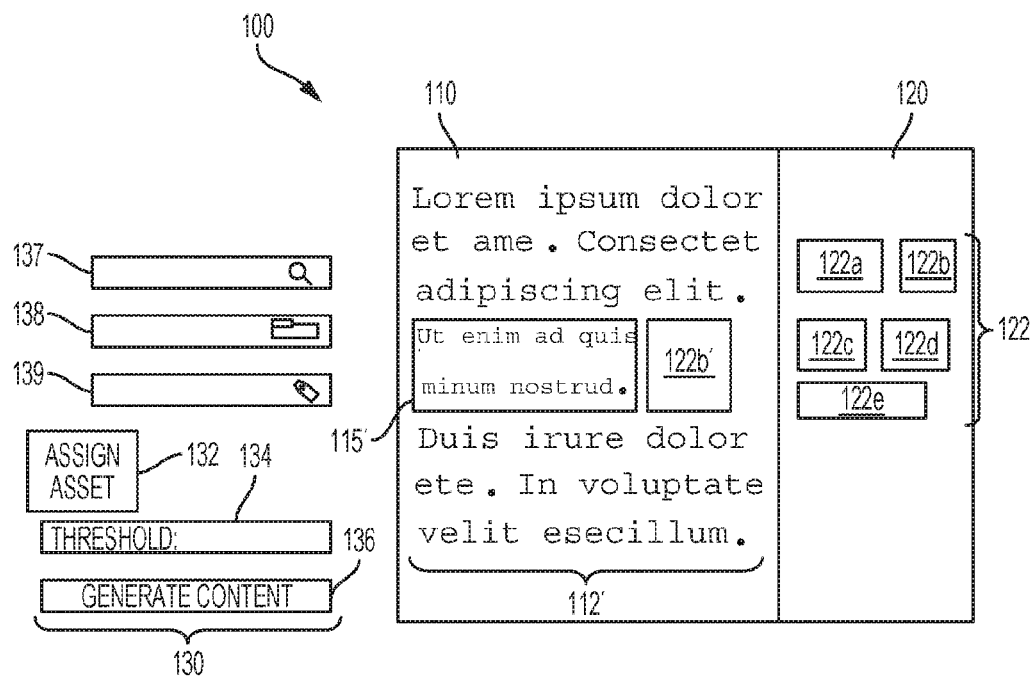
FIG. 2 is a diagram depicting another example of the user interface of FIG. 1 in which the preview panel displays media assets associated with a selected sentence according to certain embodiments.

FIG. 2 is a diagram depicting another example of the user interface 100. In this example, a particular media asset 122b' is assigned to the sentence 115', such as by element 132. The viewing pane 110 displays a modified set of sentences 112' in which the assigned media asset 122b' is displayed adjacent to the sentence 115'. In this example, multimedia content may be generated, such as by element 136, based on the displayed content comprising sentences 112' and media asset 122b'. In additional or alternative embodiments, the user interface 110 may display each of the selected sentences ranked above the received threshold adjacent to or otherwise co-located with one or more respective associated media assets.

Figure 3:
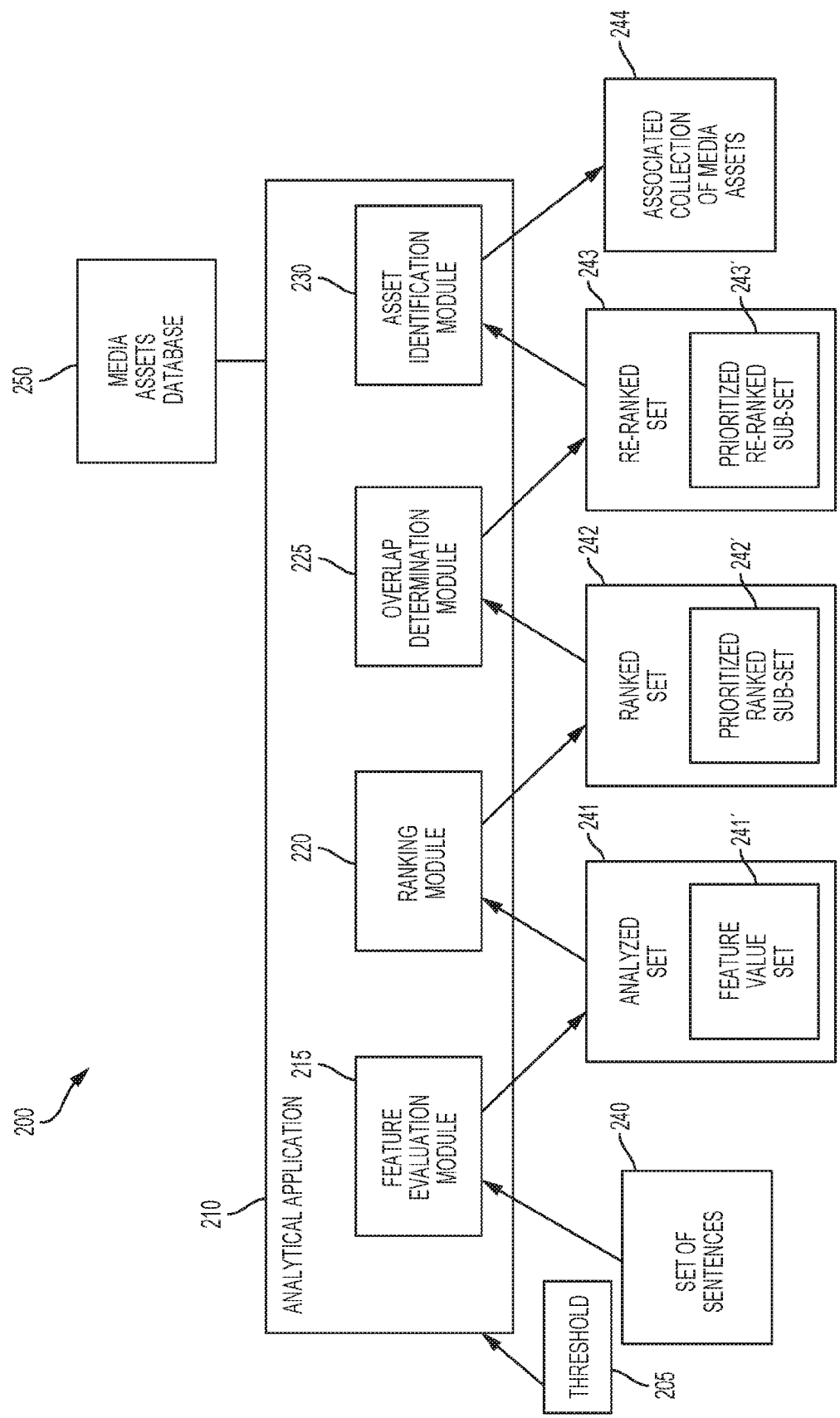
FIG. 3 is a diagram depicting an example of an analytical application for associating assets with sentences from a set, according to certain embodiments.

FIG. 3 is a block diagram depicting an example of a computing environment 200 in which analytical application 210 performs analysis of a set of sentences 230. The analytical application 210 includes one or more modules, such as a feature evaluation module 215, a ranking module 220, an overlap determination module 225, and an asset identification module 230.

The analytical application receives a threshold 205. The analytical application 210 also receives a set of sentences 240. In some embodiments, the set of sentences 240 is received from a networked repository (not shown) of text content items. The set of sentences 240 are analyzed by the feature evaluation module 215. For each sentence in the set, the feature evaluation module 215 evaluates one or more features, such as the presence of important phrases, the picturability of the sentence, the sentiments associated with the sentence, and the readability of the sentence.

For each sentence, evaluation of each feature may provide a value associated with the feature. Such provided values may have a value of one or more data types, including (but not limited to) numeric, text, Boolean, or a set of multiple types of data. For example, evaluating the presence of important phrases in a given sentence may provide a value having a numeric score indicating a degree to which the sentence contains important phrases, having a set of text strings indicating the important phrases found in the sentence, or having both. As another example, evaluating the sentiment associated with a given sentence may provide a value having a numeric score between −1 and 1 (inclusive), where a score of −1 indicates an extremely negative sentiment and a score of 1 indicates an extremely positive sentiment. (Examples of this feature evaluation are further described herein.) The feature evaluation module 215 returns an analyzed set of sentences 241, a set of associated feature values 241' for the analyzed sentences, or both.

The sentences in the analyzed set 241 are ranked by the ranking module 220. In some embodiments, the ranking module 220 receives the analyzed set of sentences 241 and the set of associated feature values 241', where the set of associated feature values 241' includes numeric values. In some embodiments, the feature values are normalized prior to ranking the sentences. The ranking module 220 returns a ranked set of sentences 242, a ranked sub-set of sentences 242' each having a prioritized rank above the threshold, or both.

In some embodiments, the ranking module 220 classifies each sentence based on the numeric feature values associated with the set of sentences 241. The classification categories indicate one of the following: 1) the sentence should not be selected to have an associated media asset; 2) the sentence may or may not be selected to have an associated media asset; or 3) the sentence should be selected to have an associated media asset. In some embodiments, sentences having the third classification described above are assigned a prioritized rank versus sentences having the first or second classification. Examples of this classification are further described herein.

In additional or alternative embodiments, the ranking module 220 determines, for each sentence in the set 241, an aggregate rating based on the numeric feature values associated with the set of sentences 241. In some embodiments, the aggregate rating for a respective sentence may indicate a numerical score, an ordered preference, or both. In additional or alternative embodiments, the sentences are ranked based on the determined aggregate ratings, where a sentence with a relatively higher rating is assigned a prioritized rank versus another sentence with a relatively lower rating. Rating determination is further described below.

In some embodiments, the ranked set of sentences 242 and the ranked sub-set of sentences 242' are optionally received by the overlap determination module 225. In some embodiments, the overlap determination module 225 generates a representation of the information content of each sentence in the ranked set 242 and the ranked sub-set 242'. An example of such a representation is a vector space model, as further described below, of a particular sentence. Based on a comparison of the representations associated with a first and second sentence, a similarity of the first and second sentence may be determined. An example of such a comparison is a count of words, or types of words, that are present in both representations. For example, representations of a first and second sentence could be compared by counting the nouns, or synonyms of nouns, that are present in both sentences.

In an iterative process, the overlap determination module 225 determines a similarity between a particular sentence having a rank below the threshold, and each sentence having a prioritized rank above the threshold. The sentence (having a prioritized rank) that is most similar to the particular sentence may be removed from the ranked sub-set 242'. For example, if a first sentence (with a prioritized rank above the threshold) is compared to a second sentence (with a rank below the threshold), and the comparison determines that the first and second sentences have similar content, the first sentence may be removed from the ranked sub-set 242'. The overlap determination module 225 further determines such similarities between each additional sentence having a rank below the threshold and each sentence having a prioritized rank above the threshold. The overlap determination module 225 further removes from the ranked sub-set 242' sentences determined to have a high degree of similarity, decreasing the likelihood that a group of very similar sentences will be associated with very similar media assets (which could result in an uninteresting reading experience for the user). An example of overlap determination is further described in regards to FIG. 5. The overlap determination module 225 returns a re-ranked set of sentences 243, a re-ranked sub-set of sentences 243' each having a prioritized rank above the threshold, or both.

In some embodiments, the asset identification module 230 receives the ranked sub-set of sentences 242' or the re-ranked sub-set of sentences 243'. In additional or alternative embodiments, the asset identification module 230 receives the ranked set of sentences 242 or the re-ranked set of sentences 243.

In some embodiments, the asset identification module 230 generates a representation of the information content of each sentence in the received sub-set or set. In additional or alternative embodiments, the asset identification module 230 generates a representation of the information content of each available asset in a group of assets. For example, a representation, such as a vector space model, can describe the content of a particular asset. A representation can be based on, for example, a list of descriptive terms or phrases (e.g., "tags") associated with the asset, or a caption for the asset. Based on a comparison of the representations associated with a sentence and an asset, a similarity of the sentence and the asset may be determined. In additional or alternative embodiments, media assets having a high degree of similarity to the sentence are associated with the selected sentence. (Examples of asset identification are further described in regards to FIG. 6.) The asset identification module 230 returns a collection of media assets 244 associated with the respective sentences the received sub-set or set.

Although the components of computing environment 200 are depicted as separate components for clarity, it is envisioned that some components may overlap or share resources within the computing system 200. For example, although the analyzed set of sentences 241 and the set of associated feature values 241' are depicted as different objects, these may be a single object, such as a single data set. As another example, although the overlap determination module 225 and the asset identification module 230 are each disclosed as generating a representation of the information content of each sentence in a received set, certain embodiments may perform such generation in a separate module that is not depicted, and provide the resulting representation to both modules 225 and 230.

Figure 4:
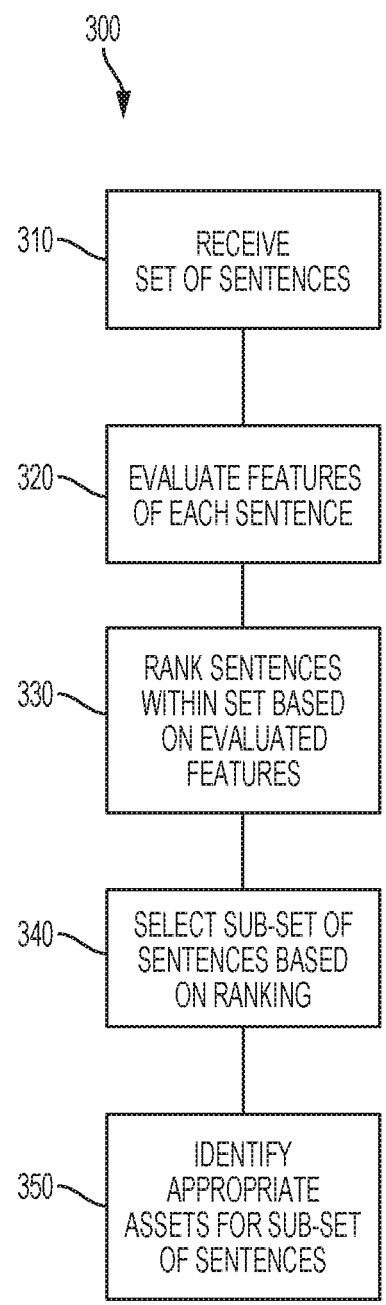
FIG. 4 is a flow chart depicting an example of a process for ranking a sub-set of sentences and identifying media assets appropriate for the sub-set, according to certain embodiments.

FIG. 4 is a flow chart depicting an example of a process 300 for analyzing a set of sentences and identifying appropriate media assets for a sub-set of the sentences. In some embodiments, an analytical application 210 implements operations depicted in FIG. 4 by executing suitable program code. For illustrative purposes, the process 300 is described with reference to the examples depicted in FIGS. 1-3. Other implementations, however, are possible.

At block 310, the process 300 involves receiving a set of sentences. In some embodiments, the received set of sentences include an article or other text content. For example, an analytical application 210 is executed by a suitable processing device for receiving a set of sentences 240. The analytical application 210 can retrieve the sentences from a non-transitory computer-readable medium or from a data source (e.g., a database) accessible via a data network. Additionally or alternatively, the analytical application 210 can receive the sentences from a client computer via a data network (e.g., a remote computer accessing the analytical application 210).

At block 320, the process 300 involves evaluating features for each sentence in the received set of sentences. A suitable processing device executes the analytical application 210 to perform one or more operations for evaluating these features. In some embodiments, evaluating a particular feature of a particular sentence determines a value for the particular feature. An example of such an evaluation for sentences is described above in regards to feature evaluation module 215, depicted in FIG. 3. For example, a feature evaluation module 215 executed by the processing device analyzes the received set of sentences 240, provides an analyzed set of sentences 241, and provides a determined set of associated feature values 241'.

At block 330, the process 300 involves ranking the sentences of the set based on the evaluated features. For example, a ranking module 220 executed by a suitable processing device receives an analyzed set of sentences 241, or a set of associated feature values 241', or both. The example ranking module 220 ranks the analyzed sentences based on the associated feature values. In some embodiments, ranking the sentences is based in part upon a threshold, such as a received threshold 205. In additional or alternative embodiments, the ranked sentences are re-ranked based on determined overlap in information content, such as described in relation to FIG. 5.

At block 340, the process 300 selects a sub-set of the ranked sentences. In some embodiments, selection of the sub-set is based in part upon a threshold, such as the received threshold 205. In additional or alternative embodiments, the sentences selected to be included in the sub-set are sentences having a rank that is above the received threshold 205. The ranking module 220 depicted in the example of FIG. 3 provides a ranked set of sentences 242, a ranked sub-set of sentences 242', or both.

At block 350, the process 300 involves identifying media assets that are appropriate for the selected sub-set of sentences. For example, the asset identification module 230 compares media assets to sentences from the selected sub-set, and identifies one or more particular assets that are similar to a particular sentence. In some embodiments, the identified assets are associated with the respective sentences. The asset identification module 230 provides a collection of media assets associated with the sentences of the selected sub-set.

Feature Evaluation

In some embodiments, each sentence in a set of sentences is evaluated to determine a value for one or more features. In additional or alternative embodiments, a rank for a particular sentence is determined based in part on the respective feature values for the particular sentence. Processes for evaluating particular features are described below. Such processes could be performed, for example, by a feature evaluation module 215 as described in regards to FIG. 3, or by a process implementing step 320 as described in regards to FIG. 4.

In some embodiments, a feature of important phrases is determined using a method such as text ranking, Luhn score-based ranking, latent semantic analysis, TF-IDF, or any other suitable method. In some embodiments, text ranking measures a similarity between text units, such as words or phrases. For example, an embodiment of text ranking builds a graph using one or more of text units (e.g., unigrams, bigrams, n-grams) as vertices. Edges are based on measure of semantic similarity between the text unit vertices. In some embodiments, semantic similarity (e.g., common words) between sentences can provide a rating of the sentence's importance as follows:

$$\text{rating(sentence)} = \sum_i \frac{\text{number\_of\_common\_words}(i, \text{sentence})}{\log_2(\text{no\_of\_words}(i) \times \text{no\_of\_words(sentence)})} \quad \text{Eq. (1)}$$

In embodiments using text ranking, the rating of the sentence is provided as a feature value for this sentence.

In some embodiments, Luhn score-based ranking provides a measure of word and phrase frequency of sentences. In an example, a particular sentence is split into multiple strings of characters and a Luhn score is determined for each string. In embodiments using Luhn score-based ranking, the maximum score from the determined scores of the strings from the sentence is provided as a feature value for that sentence.

In some embodiments, latent semantic analysis ("LSA") analyzes relationships between a set of sentences and the terms (e.g., unigrams, bigrams, n-grams) contained by the sentences. For example, an LSA performed on a set of sentences produces a set of topics related to the sentences and terms contained in the sentences. A significance score is assigned to each particular topic. A sentence rating is determined for each particular sentence by aggregating the significance scores of each topic present in the particular sentence. In embodiments using LSA, the sentence rating for the particular sentence is provided as a feature value for that sentence.

In some embodiments, a TF-IDF is determined for each sentence in a set of sentences. For each sentence in a set of sentences, a TF-IDF is determined for various unigrams, bigrams, and trigrams of words in the sentence. A resulting TF-IDF score for a particular sentence is aggregated from the various TF-IDF of the unigrams, bigrams, and trigrams of the particular sentence. An example of determining a TF-IDF is discussed below, in regards to equations 4-5. In embodiments using TF-IDF analysis, the resulting TF-IDF score for the particular sentence is provided as a feature value for that sentence.

In some embodiments, a feature of readability is determined using a method such as readability classification, a Fog index, or any other suitable method. In some embodiments, a variety of linguistic and statistical analyses are applied to each sentence in a set of sentences. Any suitable combination of linguistic and statistical analyses may be used. Based on the results of the analyses, each sentence is classified into a small set of pre-defined levels. The resulting readability classification is assigned to the particular sentence. In embodiments using readability classification, the resulting readability classification for the particular sentence is provided as a feature value for that sentence.

In some embodiments, a Fog index is determined for each sentence in a set of sentences. For example, a Fog index is determined for a particular sentence using the length of the sentence and number of complex words with three or more syllables. In some embodiments, a Fog index can be determined as follows:

$$fogindex(\text{sentence}) = 0.4 \times \text{lens}(\text{sentence}) + 40 \times \frac{no\_of\_complex\_words}{total\_no\_of\_words} \quad \text{Eq. (2)}$$

In embodiments using a Fog index, the determined Fog index for the particular sentence is provided as a feature value for that sentence.

In some embodiments, a feature of picturability is determined by calculating a picturability score, or any other suitable method. For example, a picturability score for a word or phrase is determined based on descriptive text (e.g., "tags") associated with images in an image repository. For each particular word in a particular sentence, synonyms of the word are determined. The picturability score for the particular word in is determined by counting a union of some or all images having a descriptive text containing the word or a synonym. A picturability score for the particular sentence is determined by adding the picturability scores of all words in the sentence, excluding common words or words with little meaning (e.g., "stop words"). In embodiments using picturability, the resulting picturability score for the particular sentence is provided as a feature value for that sentence.

In some embodiments, a feature of sentiment is determined by calculating a sentiment score, or any other suitable method. One example of an algorithm used to determine a sentiment score is the algorithm provided by AlchemyAPI™. The sentiment score is a real number between 1 and −1 (both inclusive). A score of 1 indicates an extremely positive sentiment, while a score of −1 indicates an extremely negative sentiment. In embodiments using a sentiment analysis, the resulting sentiment score for the particular sentence is provided as a feature value for that sentence.

Ranking by Classification

As described in regards to FIG. 3, the example ranking module 220, in certain embodiments, classifies each sentence based on the numeric feature values associated with the set of sentences 241. The example ranking module 220 can perform this classification using a classification model, such as a Random Forest model. As an example, a set of sentences and associated determined feature values are provided to a classification model. In some embodiments, the determined feature values are normalized prior to being provided to the classification model. The example classification model maintains a set of decision points on which classifications are based. In some embodiments, the example model further bases classifications on received variables.

For example, the received feature values are used as variables during the classification process. The example classification model classifies each particular sentence in the received set of sentences based on the decision points and the associated feature values for the particular sentence. In some embodiments, the classification categories indicate one of the following: 1) the sentence should not be selected to have an associated media asset; 2) the sentence may or may not be selected to have an associated media asset; or 3) the sentence should be selected to have an associated media asset. A rank is assigned to each sentence based on the classification determined by the example classification model.

In additional or alternative embodiments, a classification model produces improved classifications after receiving and analyzing a training set. For example, in embodiments that classify a set of sentences using a classification model, an additional set of sentences is provided as a training set. Each sentence in the training set has an associated previously determined rank, and associated previously determined features. For the training set, the previously determined ranks and the previously determined features may be determined by any suitable method, including any method described herein. An example classification model such as a Random Forest model receives the training set of sentences and the associated ranks and features. The example classification model adjusts the maintained set of decision points responsive to analyzing the received training sentences and the received previously determined ranks. Adjustments to the example classification model produce improved classifications for subsequently received sets of sentences. In some embodiments, ranks are assigned to analyzed sentences based on the improved classifications.

The example classification model additionally or alternatively determines a relative importance of various features to the classification of sentences after receiving and analyzing a training set. As described above, an example classification model receives a training set of sentences and associated ranks and features. The example model performs a first adjustment to the maintained set of decision points responsive to analyzing the training sentences and ranks. In some embodiments, the example model receives an additional training set, and performs an additional adjustment responsive to analyzing the additional training set. The example classification model can determine a relative importance of various features based on adjustments responsive to analyses of multiple training sets associated with the various features.

In some embodiments, a training set is associated with a type of text content. In additional or alternative embodiments, the determined relative importance of various features to the classification of sentences is associated with a type of text content. For example, responsive to analyzing training sets associated with news articles, a first classification model determines a relative importance of an important phrases feature. The first classification model provides improved ranking results for sentence sets associated with news articles. As an additional or alternative example, responsive to analyzing training sets associated with comment threads, a second classification model determines a relative importance of a sentiment feature. The second classification model provides improved ranking results for sentence sets associated with comment threads.

Ranking by Rating

As described in regards to FIG. 3, the ranking module 220, in certain embodiments, determines an aggregate rating for each sentence in the set 241 based on the numeric feature values associated with the set of sentences 241. The "aggregate rating" may also be described as a "picturizing score." (A picturizing score providing an aggregate rating is different from a picturability score providing a rating for a picturability feature.)

In certain embodiments, an aggregate rating is determined by a regression model, such as a linear regression model. The example regression model includes a dependent variable, one or more independent variables, and a coefficient corresponding to each of the independent variables. In some embodiments, the dependent variable corresponds to an aggregate rating, and the one or more independent variables correspond to one or more received feature values. In some embodiments, the coefficients corresponding to each of the independent variables have a default value, or have a value based on analysis of one or more sets of sentences. As an example, a set of sentences and associated determined feature values are provided to a regression model. In some embodiments, the determined feature values are normalized prior to being provided to the regression model. The example regression model determines an aggregate rating for each sentence in the set based on the associated determined feature values. In additional or alternative embodiments, the received sentences are ranked based on the respective determined aggregate ratings, where a sentence with a rating of relatively higher priority is ranked above another sentence with a rating of relatively lower priority.

In additional or alternative embodiments, a regression model produces improved aggregate ratings after receiving and analyzing a training set. For example, in embodiments that rank a set of sentences using a regression model, one or more additional sets of sentences are provided as a training set. Each sentence in the training set is associated with a previously determined rank and previously determined features. In some embodiments, the previously determined ranks and the previously determined features may be determined by any suitable method, including any method described herein.

Additionally or alternatively, each sentence in the training sets are associated with previously determined features and previously determined media assets, where the ranks for the training sets are determined using the following formula:

$$S_{i,j} = \frac{n_{i,j}}{\log_2(N_j + 1)} \quad \text{Eq. (3)}$$

Here, $S_{i,j}$ refers to the normalized score of the ith sentence in the jth training set, $n_{i,j}$ refers to the number of media assets associated corresponding to the ith sentence in the jth webpage and $N_j$ refers to the total number of images corresponding to text in the jth webpage. An example regression model then receives the training sets and the associated determined ranks.

An example regression model such as a linear regression model receives the training set of sentences and the associated ranks and features. The example regression model adjusts a value for each coefficient corresponding to each of the independent variables, responsive to analyzing the received training sentences and the received previously determined ranks. Adjustments to the example regression model produce improved aggregated ratings for subsequently received sets of sentences. In some embodiments, ranks are assigned to analyzed sentences based on the improved aggregated rating.

Additionally or alternatively, adjustments to the coefficient values corresponding to the independent variables indicates a relative importance of various features to determining aggregate ratings after receiving and analyzing a training set. In some embodiments, as described above, the one or more independent variables correspond to one or more received feature values. As further described above, an example regression model receives a training set of sentences and associated ranks and features. The example model performs an adjustment to the coefficient values responsive to analyzing the training sentences and ranks. In some embodiments, the coefficient values are compared, and a particular coefficient having a value different from a value of another coefficient is determined to correspond to a particular feature having a high relative importance to determining aggregate ratings of sentences in sets. For example, in certain embodiments, a first coefficient having a relatively higher value as compared to a second coefficient, indicates that a first feature, corresponding to the first coefficient, has a higher relative importance to determining aggregate ratings as compared to the second feature, corresponding to the second coefficient. In additional or alternative embodiments, a feature having a higher relative importance is indicated by a coefficient having a relatively lower value.

In some embodiments, a training set is associated with a type of text content. In additional or alternative embodiments, the determined relative importance of various features to determining the aggregate ratings is associated with a type of text content. For example, responsive to analyzing training sets associated with news articles, a first regression model determines a relative importance of an important phrases feature. The example first regression model provides improved ranking results for sentence sets associated with news articles. As an additional or alternative example, responsive to analyzing training sets associated with comment threads, a second regression model determines a relative importance of a sentiment feature. The example second regression model provides improved ranking results for sentence sets associated with comment threads.

Vector Space Model Representation

In some embodiments, the analytical application 210 uses a representation of the information content of a sentence, or other text item. For example, overlap determination module 225 and asset identification module 230 each may generate such representations of a set of sentences or of a group of assets, and determine similarities between sentences and assets based upon the generated representations. In some embodiments, such representations are each a vector space model representation. In additional or alternative embodiments, a vector space model representation is generated for a particular collection of text, such as a sentence, a caption for an image, or a group of descriptive terms for an asset. For simplicity, and not by way of limitation, such a collection of text will be referred to as a document.

In some embodiments, to determine a vector representation for each document in a set of documents, inverse document frequency ("IDF") of a term (where the term may be any of a word, a bigram of words, an n-gram of words, etc.) is calculated for the set of documents as follows:

$$IDF(t) = \log_2\left(\frac{N_t}{|D|}\right) \qquad \text{Eq. (4)}$$

Here, $N_t$ is the number of documents containing the term t, and $|D|$ is the total number of documents.

The term frequency-inverse document frequency ("TF-IDF") of a single term t for a particular document d is calculated as:

$$\text{tfidf}(t,d) = n_{t,d} * IDF(t) \qquad \text{Eq. (5)}$$

Here, $n_{t,d}$ is the count of term t in the document d normalized by the total number of terms in the document d. For example, term-frequency of an example term "house" in a document "He lives in a house" is $\frac{1}{5}=0.2$, if only unigrams of words are being considered. The vector representation for a particular document $D_i$ is a vector of all calculated values tfidf(t,d) for all terms t in the particular document $D_i$.

Cosine similarity between vectors for documents $D_p$ and $D_q$ is determined as follows:

$$sim(D_p, D_q) = \frac{\sum_{i=1}^{N} w_{i,p} * w_{j,q}}{\sqrt{\sum_{i=1}^{N} w_{i,p}^2} \sqrt{\sum_{i=1}^{N} w_{i,q}^2}} \qquad \text{Eq. (6)}$$

Here, N is the total number of terms under consideration, and $w_{i,p}$ is the ith term in the vector space representation of the pth document.

Overlap Determination

In some embodiments, a ranked set of sentences are re-ranked based on overlapping content conveyed by the sentences. For example, the overlap determination module 225 determines overlapping content within a ranked set of sentences 242 and provides a re-ranked set 243. In some embodiments, the overlap determination module 225 generates a representation of the information content of each sentence in the ranked set 242. In additional or alternative embodiments, the representations of the sentences may each be a vector space model representation, as described above. In some embodiments, similarities between sentences are determined by calculating a cosine similarity between the associated vector representations, as described regarding equation 6 above. In some embodiments, the overlap determination module 225 determines information overlap based on an iterative algorithm of maximum marginal relevance ("MMR"). For example, the MMR algorithm uses the following formula:

$$\max_{D_i \in R-S} \left[ \lambda * \text{Aggregate\_rating}_{D_i} - (1 - \lambda) \max_{D_j \in S} sim(D_i, D_j) \right] \qquad \text{Eq. (7)}$$

Here, R is the set of all sentences in the current text item (e.g., an article). S is the ranked sub-set of sentences from R; R-S is the set difference (i.e, the set of as yet unselected sentences in R); $sim(D_i; D_j)$ is the cosine similarity score between vector space representations of $D_i$ and $D_j$, as described regarding equation 6. Regarding the second term in equation 7, the cosine similarity is determined for each unselected sentence $D_i$ (from the set R-S) as compared to each ranked sentence $D_j$ (from the ranked sub-set 5), and the maximum value is selected. This maximum value is then subtracted from the aggregate rating of $D_i$. These steps can be repeated for every sentence $D_i$ in the set of R-S, and the maximum of these values is then selected. Parameter λ controls the relative importance of the aggregate rating of $D_i$ versus the cosine similarity (e.g., overlap) with the other sentences $D_j$, and takes a real value between 0 and 1 (both inclusive). A higher value of λ gives a high importance to the aggregate rating, and gives a low importance to the cosine similarity between $D_i$ and $D_j$.

Equation 7 can be used, for example, by an overlap determination module 225, as described in regards to FIG. 3, to determine if a ranked sub-set, such as sub-set 242', should be re-ranked to eliminate overlap. For example, a first sentence $D_i$ (having a rank below a threshold, as described for overlap determination module 225) can be compared, using equation 7, to a second sentence $D_j$ (having a rank above the threshold). If the first sentence has a relatively high aggregate rating, and the cosine similarity between the first and second sentences is relatively low, the first sentence $D_i$ could be selected to replace the second sentence $D_j$ in the sub-set 242'. Given the iterative nature of equation 7, this example outcome is, of course, dependent upon the additional comparisons of all other $D_i$ to all other $D_j$.

Figure 5:
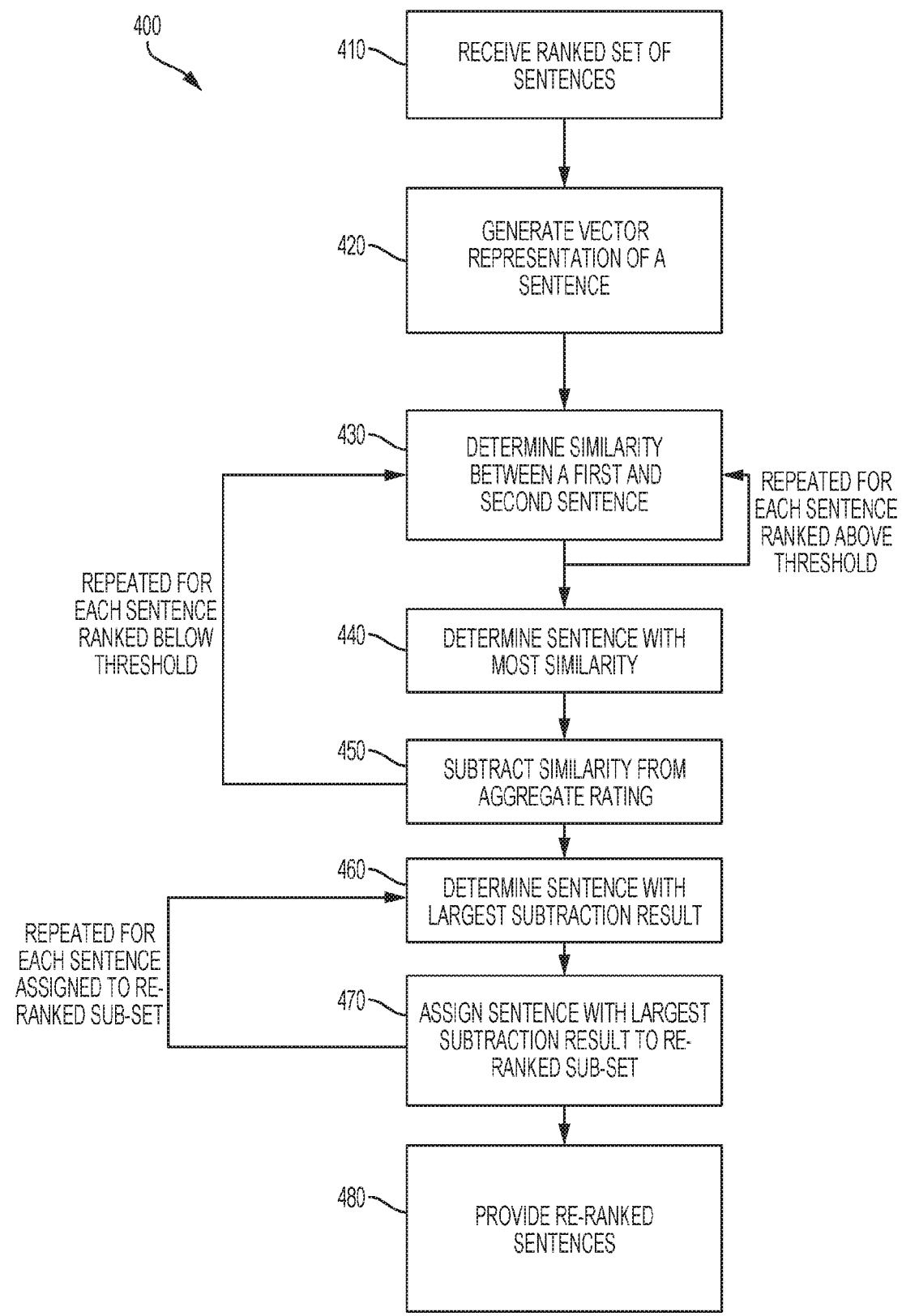
FIG. 5 is a flow chart depicting an example of a process for re-ranking sentences in a set provided by the process of FIG. 4 based on determined overlap in the information content of the sentences, according to certain embodiments.

FIG. 5 is a flow chart depicting an example of a process 400 for determining information overlap between sentences in a ranked set and re-ranking the sentences within the set. In some embodiments, an overlap determination module 225 implements operations depicted in FIG. 5 by executing suitable program code. For illustrative purposes, the process 400 is described with reference to the examples depicted in FIGS. 1-4. Other implementations, however, are possible.

At block 410, the process 400 involves receiving a ranked set of sentences that may include a sub-set of sentences having a prioritized rank. As noted above regarding FIG. 3, the example overlap determination module 225 is executed by a suitable processing device for receiving a ranked set of sentences 242, or a ranked sub-set of sentences 242', or both.

At block 420, the process 400 involves generating a vector representation of a sentence from the received set. For example, overlap determination module 225 is executed by a suitable processing device to generate a vector representation as described above in regards to equations 4-6. Block 420 may be repeated for additional sentences from the received set.

At block 430, the process 400 involves determining a similarity between a first sentence having a rank below the threshold, and a second sentence having a prioritized rank above the threshold. In the example MMR algorithm, the first sentence is iteratively compared against each sentence having a prioritized rank above the threshold. For example, the overlap determination module 225 determines a similarity between a particular sentence having a rank below the threshold, and each sentence having a prioritized rank above the threshold. Block 430 may be repeated for additional sentences having a prioritized rank above the threshold.

At block 440, the process 400 involves determining the particular sentence, having a prioritized rank, that is most similar to the first sentence having a rank below the threshold. For example, similarity may be determined by using the cosine similarity algorithm described herein, or by any other suitable method.

At block 450, the process 400 involves subtracting the determined similarity between the first sentence and the particular sentence that is most similar to the first sentence from the aggregate rating of the first sentence. In some embodiments, this subtraction is weighted by a parameter λ as described regarding equation 7. The numerical result of this subtraction is associated with the first sentence.

The process 400 repeats blocks 430-450 for every additional sentence having a rank below the threshold.

At block 460, the process 400 involves determining the particular sentence, having a rank below the threshold, that is associated with a largest numerical result of the subtraction preformed in block 450. At block 470, the process 400 involves assigning the determined particular sentence associated with the largest numerical result to a re-ranked sub-set of sentences. For example, the overlap determination module 225 assigns to re-ranked sub-set 243' the particular sentence associated with the largest numerical result.

In some embodiments, the process 400 repeats blocks 460-470 such that an appropriate number of sentences are assigned to the re-ranked sub-set of sentences. For example, if threshold 205 indicates that five sentences are to be associated with media assets, overlap determination module 225 implements operations associated with blocks 460-470 until five sentences having the respective largest numerical results are assigned to re-ranked sub-set 243'.

At block 480, the process 400 involves providing the re-ranked set of sentences. For example, the example overlap identification module 225 provides the re-ranked set of sentences 243, the re-ranked sub-set 243', or both. In some embodiments, the re-ranked set of sentences is used to select a sub-set of sentences for association with one or more media assets, such as described in regards to FIG. 4.

Identifying Assets

In certain embodiments, one or more media assets are associated with a selected sentence based on a comparison of the selected sentence with available media assets. As described above regarding FIG. 3, the asset identification module 230 generates a representation of the information content of a selected sentence, and further generates a representation of the information content a media asset. In additional or alternative embodiments, the representations of the sentence and of the asset may each be a vector space model representation, as described above. In some embodiments, the vector representation associated with the sentence is compared to the vector representations associated with one or more of the assets to determine a degree of similarity between the vector representations. In additional or alternative embodiments, media assets with a vector having a high degree of similarity to the sentence vector are associated with the selected sentence.

For example, a vector representation of a particular media asset is generated based on descriptive text related to the particular asset, such as a caption, or a group of descriptive terms or phrases (e.g., "tags") associated with the asset. Other selections of descriptive text related to a particular media asset will be apparent to one skilled in the art. As an example, a vector representation of a particular sentence is generated based on text in the sentence. In some embodiments, a similarity of the sentence and the asset may be determined based on a comparison of the vector representation associated with the sentence to the vector representation associated with the asset, where the similarity is determined by equation 6, as described above. In additional or alternative embodiments, media assets having a high degree of similarity to the sentence are associated with the selected sentence.

Figure 6:
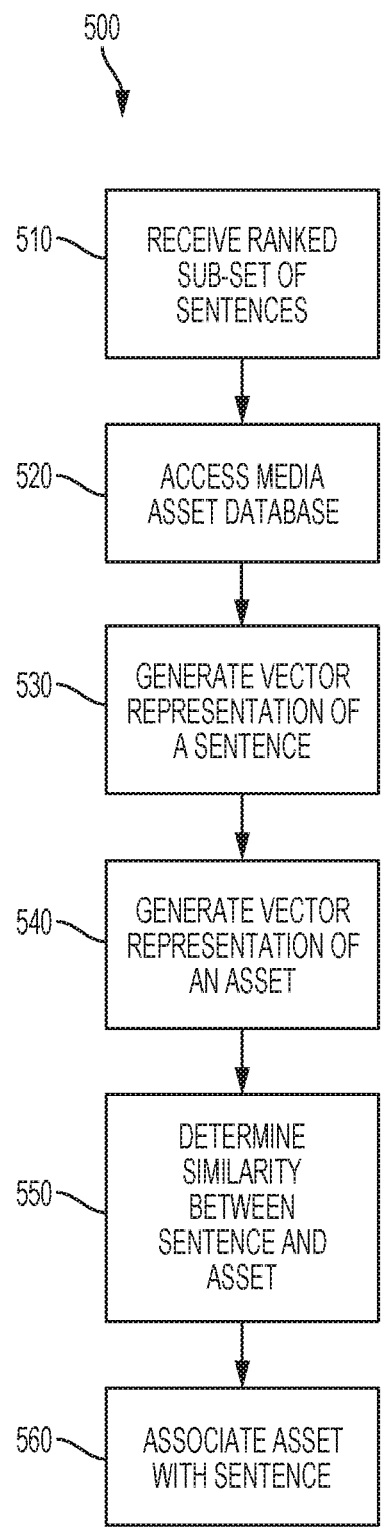
FIG. 6 is a flow chart depicting an example of a process for identifying media assets appropriate for a sub-set of sentences provided by the processes of FIG. 4 or 5, according to certain embodiments.

FIG. 6 is a flow chart depicting an example of a process 500 for analyzing a set of sentences and identifying appropriate media assets for a sub-set of the sentences. In some embodiments, an asset identification module 230 implements operations depicted in FIG. 6 by executing suitable program code. For illustrative purposes, the process 500 is described with reference to the examples depicted in FIGS. 1-5. Other implementations, however, are possible.

At block 510, the process 500 involves receiving a ranked sub-set of sentences. As noted above regarding FIG. 3, the asset identification module 230 may receive one or more of the ranked sub-set of sentences 242', the re-ranked sub-set of sentences 243', the ranked set of sentences 242, or the re-ranked set of sentences 243. For simplicity, and not by way of limitation, it will be understood that the "received ranked sub-set of sentences" described in block 510 may refer to any of these.

At block 520, the process 500 involves accessing a database, or other repository, of available media assets. A suitable processing device executing the analytical application 210 can access the database or other repository of assets via a network or from a non-transitory computer-readable medium included in or other otherwise local to a computing system that includes the processing device. The asset identification module 230 may access all of the available assets, or a group of the available assets.

At block 530, the process 500 involves generating a vector representation of a sentence from the received sub-set. For example, the asset identification module 230 generates a vector representation as described above in regards to equations 4 and 5. Block 530 may be repeated for additional sentences from the received sub-set.

At block 540, the process 500 involves generating a vector representation of an asset from the accessed database of assets. For example, asset identification module 230 generates a vector representation as described above in regards to equations 4 and 5. Block 540 may be repeated for additional assets from the accessed database of assets.

At block 550, the process 500 involves determining a similarity between a sentence having a representation and an asset having a representation. For example, the asset identification module 230 determines cosine similarity between the vector representations of a particular sentence and a particular asset as described above in regards to equation 6. Block 550 may be repeated for additional comparisons between additional sentences and additional assets.

At block 560, the process 500 involves associating a particular asset with a particular sentence, based on the determined similarity between the sentence and asset. For example, asset identification module 230 associates one or more assets with a particular sentence. In some embodiments, the module 230 associates the asset having the highest degree of similarity with the particular sentence and excludes one or more assets having lower degrees of similarity. In additional or alternative embodiments, the module 230 associates additional assets having sufficiently high degrees of similarity with the particular sentence, where the sufficiently high degree is determined in part by one or more of a received value, a default value, a value based upon an example preview pane 120 in example user interface 100, or any other suitable value.

Figure 7:
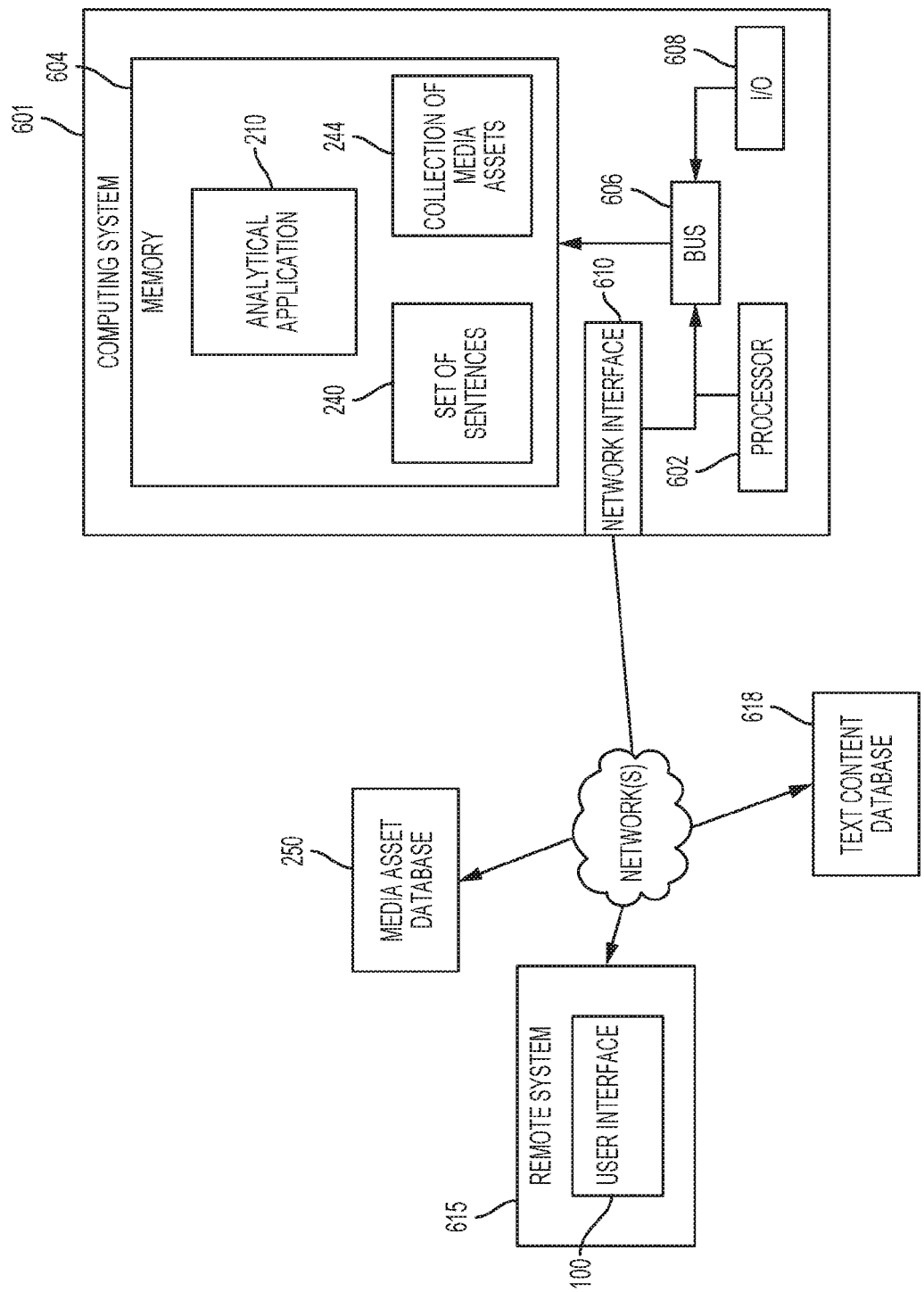
FIG. 7 is a block diagram depicting an example of an implementation of a computing system including an analytical application, according to certain embodiments.

Any suitable computing system or group of computing systems can be used for performing the operations described herein. For example, FIG. 7 is a block diagram depicting an example implementation of an analysis system according to certain embodiments.

The depicted example of a computing system 601 includes one or more processors 602 communicatively coupled to one or more memory devices 604. The processor 602 executes computer-executable program code or accesses information stored in the memory device 604. Examples of processor 602 include a microprocessor, an application-specific integrated circuit ("ASIC"), a field-programmable gate array ("FPGA"), or other suitable processing device. The processor 602 can include any number of processing devices, including one.

The memory device 604 includes any suitable non-transitory computer-readable medium for storing the analytical application 210, the set of sentences 240, the associated collection of media assets 244, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 601 may also include a number of external or internal devices such as input or output devices. For example, the computing system 601 is shown with an input/output ("I/O") interface 608 that can receive input from input devices or provide output to output devices. A bus 606 can also be included in the computing system 601. The bus 606 can communicatively couple one or more components of the computing system 601.

The computing system 601 executes program code that configures the processor 602 to perform one or more of the operations described above with respect to FIGS. 1-6. The program code includes operations related to, for example, one or more of the analytical application 210, the set of sentences 240, the associated collection of media assets 244, or other suitable applications or memory structures that perform one or more operations described herein. The program code may be resident in the memory device 604 or any suitable computer-readable medium and may be executed by the processor 602 or any other suitable processor. In some embodiments, the program code described above, the analytical application 210, the set of sentences 240, and the associated collection of media assets 244 are stored in the memory device 604, as depicted in FIG. 7. In additional or alternative embodiments, one or more of the analytical application 210, the set of sentences 240, the associated collection of media assets 244, and the program code described above are stored in one or more memory devices accessible via a data network, such as a memory device accessible via a cloud service.

The computing system 601 depicted in FIG. 7 also includes at least one network interface 610. The network interface 610 includes any device or group of devices suitable for establishing a wired or wireless data connection to one or more data networks 612. Non-limiting examples of the network interface 610 include an Ethernet network adapter, a modem, and/or the like. The computing system 601 is able to communicate with one or more of the remote computing system 615, including a user interface 100 on the remote system 615, the media asset database 250, and the text content database 618 using the network interface 610.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of creating multimedia content comprising both media assets and text describing the media assets, the method comprising:

receiving, by a processing device, a set of sentences and a threshold number of sentences in the set to be accompanied by a media asset;

determining, by the processing device and for each sentence in the set, a respective rank based on a combination of features;

ranking the sentences within the set based on the determined ranks for the sentences;

selecting, by the processing device, a first ranked sentence having a ranking below the threshold number, a second ranked sentence having a ranking above the threshold number, and a third ranked sentence having a ranking above the threshold number;

determining, by the processing device, a first degree of overlap between the first sentence and the second sentence, wherein the first degree of overlap is determined based on a first cosine similarity between a first vector space representation associated with the first sentence and a second vector space representation associated with the second sentence;

determining, by the processing device, a second degree of overlap between the first sentence and the third sentence, wherein the second degree of overlap is determined based on a second cosine similarity between the first vector space representation and a third vector space representation associated with the third sentence;

responsive to determining that the first degree of overlap is less than the second degree of overlap, performing a subsequent ranking operation on the ranked sentences, wherein the first ranked sentence is subsequently ranked above the second ranked sentence;

selecting, by the processing device, a sub-set of the sentences based upon the subsequent ranking operation; and generating, by the processing device, content comprising each respective sentence in the sub-set of sentences co-located with a respective media asset associated with the respective sentence.

2. The method of claim 1, wherein the combination of features comprises at least two of:
a phrase having a threshold importance to semantic content of the sentence,
a picturability of the sentence indicating a degree to which information in the sentence can be represented by a particular media asset,
a sentiment score for the sentence, or
a readability rating for the sentence.

3. The method of claim 2, wherein determining the respective rank further comprises:
receiving an additional set of sentences each having a respective previously determined rank based on a group of features comprising at least two of additional identified phrases having the threshold importance, an additional picturability, an additional sentiment score, and an readability rating; and
evaluating the additional set of sentences to determine a relative importance of each feature in the group of features, wherein the respective rank for each sentence in the set of sentences is determined based on the determined relative importance.

4. The method of claim 1, wherein:
determining the respective rank further comprises identifying a degree to which each sentence in the set of sentences requires an accompanying media asset based on the combination of features; and
ranking the sentences further comprises classifying, based on the identified degree and the received threshold, whether each sentence in the set of sentences requires an accompanying media asset.

5. The method of claim 4, wherein classifying whether each sentence in the set of sentences requires an accompanying media asset further comprises:
for each sentence, providing additional values corresponding to each feature of the combination of features;
based on the additional values for sentences in the set of sentences, determining an error for each feature of the combination of features;
comparing the determined errors; and
determining that a first feature having larger error relative to a second feature has a higher relative importance to classifying sentences.

6. The method of claim 1, wherein determining the respective rank further comprises:
for each sentence in the set of sentences, providing additional values corresponding to each feature of the combination of features;
based on the additional values for sentences in the set of sentences, determining coefficients for a regression model;
for each sentence in the set of sentences, determining an aggregate rating based upon the regression mode; and
prioritizing a first sentence with a relatively higher aggregate rating over a second sentence with a relatively lower aggregate rating.

7. The method of claim 1, further comprising displaying the generated content having the respective media asset next to the respective sentence.

8. The method of claim 1, wherein generating the content comprises:
accessing a repository containing media assets, each media asset having associated text;
comparing the respective sentence to the associated text of at least two of the media assets in the repository; and
selecting a given media asset based on a similarity between the respective sentence to the associated text of the given media asset.

9. A system comprising:
a repository containing media assets,
a memory, and
a processor for executing instructions stored in a computer-readable medium, wherein when executed by the processor, the instructions perform operations comprising:
receiving a set of sentences and a threshold number of sentences in the set to be accompanied by a media asset;
determining, for each sentence in the set of sentences, a respective rank, wherein determining the respective rank is determined based on at least two of:
a phrase having a threshold importance to semantic content of the sentence,
a picturability of the sentence indicating a degree to which information in the sentence can be represented by a particular media asset,
a sentiment score for the sentence, or
a readability rating for the sentence, and
ranking the sentences within the set based on the determined ranks for the sentences;
selecting a first sub-set of the sentences having a rank above the received threshold number of sentences;
selecting a first ranked sentence in the set of sentences, the first sentence having a ranking below the threshold number;

selecting a second ranked sentence in the first sub-set of the sentences, the second sentence having a ranking above the threshold number;

selecting a third ranked sentence in the first sub-set of the sentences, the third sentence having a ranking above the threshold number;

determining a first degree of overlap between the first sentence and the second sentence, wherein the first degree of overlap is determined based on a first cosine similarity between a first vector space representation associated with the first sentence and a second vector space representation associated with the second sentence;

determining a second degree of overlap between the first sentence and the third sentence, wherein the second degree of overlap is determined based on a second cosine similarity between the first vector space representation and a second vector space representation associated with the third sentence; and responsive to determining that the first degree of overlap is less than the second degree of overlap, performing a subsequent ranking operation on the ranked sentences, wherein the first ranked sentence is subsequently ranked above the second ranked sentence;

selecting a second sub-set of the sentences based upon the subsequent ranking operation; and selecting, from the repository and based on the second sub-set of the sentences, one or more of the media assets for inclusion in a web page or other electronic content.

10. The system of claim 9, wherein determining the respective rank further comprises:

receiving an additional set of sentences each having a respective previously determined rank based on a group of features comprising at least two of:
additional identified phrases having threshold degrees of importance in the additional set of sentences,
an additional picturability for one or more of the additional set of sentences,
an additional sentiment score for one or more of additional set of sentences, and
an readability rating for one or more of additional set of sentences;

evaluating the additional set of sentences to determine a relative importance of each feature in the group of features; and determining the respective rank based in part upon the determined relative importance of each feature in the group of features.

11. The system of claim 9, wherein determining the respective rank further comprises identifying a degree to which each sentence in the set requires an accompanying media asset based on the picturability, the phrase, the sentiment score, or the readability rating, and wherein ranking the sentences further comprises classifying, based on the identified degree and the received threshold, whether each sentence in the set requires an accompanying media asset.

12. The system of claim 11, wherein classifying whether each sentence in the set requires an accompanying media asset further comprises:

for each sentence, providing additional values corresponding to each of the picturability, the phrase, the sentiment score, or the readability rating;

based on the additional values for sentences in the set, determining an error for each of the picturability, the phrase, the sentiment score, or the readability rating;

comparing the determined errors; and determining that a first error having larger value relative to a second error has a higher relative importance to classifying sentences.

13. The system of claim 9, wherein determining the respective rank further comprises:

for each sentence in the set of sentences, providing additional values corresponding to each of the picturability, the phrase, the sentiment score, or the readability rating;

based on the additional values for sentences in the set of sentences, determining coefficients for a regression model;

for each sentence in the set of sentences, determining an aggregate rating based upon the regression model; and determining the respective rank comprises prioritizing a first sentence with a relatively higher aggregate rating over a second sentence with a relatively lower aggregate rating.

14. The system of claim 9, the operations further comprising generating the web page or other electronic content comprising each of the second sub-set of the sentences co-located with a respective media asset associated with one or more sentences of the second sub-set of the sentences.

15. A non-transitory computer-readable medium on which is encoded program code for creating multimedia content comprising both media assets and text describing the media assets, the program code comprising:

program code for receiving, by a processing device, a set of sentences and a threshold number of sentences in the set to be accompanied by a media asset;

program code for determining, by the processing device and for each sentence in the set, a respective rank based on a combination of features;

program code for ranking the sentences within the set based on the determined ranks for the sentences;

program code for selecting a first ranked sentence having a ranking below the threshold number, a second ranked sentence having a ranking above the threshold number, and a third ranked sentence having a ranking above the threshold number;

program code for determining a first degree of overlap between the first sentence and the second sentence, wherein the first degree of overlap is determined based on a first cosine similarity between a first vector space representation associated with the first sentence and a second vector space representation associated with the second sentence;

program code for determining a second degree of overlap between the first sentence and the third sentence, wherein the second degree of overlap is determined based on a second cosine similarity between the first vector space representation and a third vector space representation associated with the third sentence; and program code for, responsive to determining that the first degree of overlap is less than the second degree of overlap, performing a subsequent ranking operation on the ranked sentences, wherein the first ranked sentence is subsequently ranked above the second ranked sentence;

program code for selecting, by the processing device, a sub-set of the sentences based upon the subsequent ranking operation; and program code for generating, by the processing device, content comprising each respective sentence in the sub-set of sentences co-located with a respective media asset associated with the respective sentence.

16. The non-transitory computer-readable medium of claim 15, wherein the combination of features comprises at least two of:
   a phrase having a threshold importance to semantic content of the sentence,
   a picturability of the sentence indicating a degree to which information in the sentence can be represented by a particular media asset,
   a sentiment score for the sentence, or
   a readability rating for the sentence.

17. The non-transitory computer-readable medium of claim 16, wherein determining the respective rank further comprises:
   program code for receiving an additional set of sentences each having a respective previously determined rank based on a group of features comprising at least two of additional identified phrases having the threshold importance, an additional picturability, an additional sentiment score, and a readability rating;
   program code for evaluating the additional set of sentences to determine a relative importance of each feature in the group of features; and
   program code for determining the respective rank based in part upon the determined relative importance of each feature in the group of features.

18. The non-transitory computer-readable medium of claim 15, wherein determining the respective rank further comprises:
   program code for providing for each sentence in the set of sentences, additional values corresponding to each feature of the combination of features;
   program code for determining, based on the additional values for sentences in the set of sentences, coefficients for a regression model;
   program code for determining, for each sentence in the set of sentences, an aggregate rating based upon the regression model; and
   program code for prioritizing a first sentence with a relatively higher aggregate rating over a second sentence with a relatively lower aggregate rating.

* * * * *